United States Patent [19]

McKinney et al.

[11] Patent Number: 4,678,836

[45] Date of Patent: Jul. 7, 1987

[54] BLENDS OF ETHYLENE/ACRYLIC ACID COPOLYMERS WITH LINEAR LOW DENSITY POLYETHYLENE

[75] Inventors: Osborne K. McKinney; James A. Allen; David P. Flores, all of Lake Jackson, Tex.

[73] Assignee: The Dow Chemical Company, Midland, Mich.

[21] Appl. No.: 777,997

[22] Filed: Sep. 20, 1985

Related U.S. Application Data

[63] Continuation of Ser. No. 567,721, Jan. 3, 1984, abandoned.

[51] Int. Cl.⁴ ................... C08L 23/18; C08L 33/02; C08L 23/08
[52] U.S. Cl. .................................................. 525/221
[58] Field of Search .......................................... 525/221

[56] References Cited

U.S. PATENT DOCUMENTS

| | | | |
|---|---|---|---|
| 3,410,928 | 11/1968 | Baum | 525/221 |
| 3,709,957 | 1/1973 | Brebner | 525/221 |
| 4,024,323 | 5/1977 | Versteegh | 525/221 |
| 4,376,845 | 3/1983 | Metzger | 525/196 |
| 4,420,580 | 12/1983 | Herman et al. | 525/221 |

FOREIGN PATENT DOCUMENTS 2019412 10/1979 United Kingdom.

*Primary Examiner*—Carman J. Seccuro
*Attorney, Agent, or Firm*—Walter J. Lee

[57] ABSTRACT

Blends of linear low density polyethylene (LLDPE) with ethylene/acrylic acid copolymer (E/AA) are prepared which exhibit improved optical, impact, heat-seal, and anti-blocking properties as compared to the E/AA copolymer alone.

20 Claims, No Drawings

BLENDS OF ETHYLENE/ACRYLIC ACID COPOLYMERS WITH LINEAR LOW DENSITY POLYETHYLENE

CROSS-REFERENCE TO RELATED APPLICATION

This is a continuation of application Ser. No. 567,721, filed Jan. 3, 1982, now abandoned.

BACKGROUND OF THE INVENTION

Ethylene polymerized with acrylic acid to form copolymers is taught, for example, in U.S. Pat. No. 2,391,218; U.S. Pat. No. 3,239,370; U.S. Pat. No. 3,520,861 and U.S. Pat. No. 4,351,931.

Ethylene polymerized with higher olefins, by the action of a coordination catalyst, to form linear low density ethylene polymers (a.k.a. LLDPE), is taught, for example, in U.S. Pat. No. 4,076,698; U.S. Pat. No. 3,058,963; U.S. Pat. No. 2,846,425; U.S. Pat. No. 2,905,645; and U.S. Pat. No. 2,396,785.

Blends of certain olefin polymers and ethylene/acrylic acid copolymers are taught, for example, in U.S. Pat. No. 3,410,928 and U.S. Pat. No. 3,600,468.

There are, basically, two types of olefin polymerization techniques for preparing high molecular weight olefin polymers and copolymers. The oldest commercial technique involves high pressure, high temperature, and the use of a free radical initiator, such as a peroxide; these type polymers are generally known as low density polyethylene (LDPE) and are also known as ICI-type polyethylenes. These LDPE polymers contain branched chains of polymerized monomer units pendant from the main polymer "backbone" and generally have densities in the range of about 0.910–0.935 gms./cc.

The other commercially-used technique involves coordination catalysts of the "Ziegler" type or "Phillips" type and includes variations of the Ziegler type, such as the Natta type. The catalysts may be used at very high pressures, but are generally used at very low or intermediate pressures. The products made by these coordination catalysts are generally known as "linear" polymers because of the substantial absence of branched chains of polymerized monomer units pendant from the main polymer "backbone," and they are also generally known as high density polyethylene (HDPE). It is these "linear" polymers to which the present invention pertains. Linear polyethylene (HDPE) ordinarily has a density in the range of 0.94 to 0.98 gms./cc.

In particular, the present invention pertains to "linear" type ethylene polymers wherein ethylene has been polymerized along with minor amounts of alpha, beta-ethylenically unsaturated alkenes having from 3 to 12 carbons per alkene molecule, preferably 4 to 8. The amount of the alkene comonomer is generally sufficient to cause the density of the polymer to be substantially in the sane density range as LDPE, due to the alkyl side chains on the polymer molecule, yet the polymer remains in the "linear" classification; they are conveniently referred to as "linear low density polyethylene" (LLDPE). These polymers retain much of the strength, crystallinity, and toughness normally found in HDPE homopolymers of ethylene, but the higher alkene comomers impart high "block" characteristics to extrusion-cast films and the high "slip" (i.e. low coefficient of friction) characteristic inherently found in HDPE is diminished.

SUMMARY OF THE INVENTION

Blends of linear low density polyethylene (LLDPE) with ethylene/acrylic acid copolymer (E/AA) are prepared which exhibit improved optical, impact, heat-seal, and anti-blocking properties as compared to the E/AA alone.

DETAILED DESCRIPTIONS

Linear low density polyethylene (LLDPE) is a term applied to ethylene interpolymers produced using a coordination catalyst, the chain-structure of the polymer molecules being substantially linear, as opposed to molecules having branches or side-chains of polymerized monomer units. In LLDPE, the pendant groups along the chain are essentially attributable to olefin comonomer moieties (other than ethylene) which have had their olefin groups polymerized directly into the polymer chain along with the copolymerized ethylene groups. A pronounced effect of the copolymerized olefin comonomers is that the density of the linear polymer is decreased, yet the molecule structure remains substantially linear. These LLDPE polymers are "random interpolymers", as opposed to "block copolymers" or "graft copolymers".

Ordinarily, a coordination catalyst produces a high density polyethylene (HDPE); its high density (generally in the range of about 0.94 to 0.98 gms./cc) is generally attributed to the fact that there is a substantial absence of side-chains or pendant groups. Coordination catalysts include, principally, the well-known Ziegler catalysts, Natta catalysts, Ziegler-Natta catalysts, the Phillips chromium oxide catalyst, and varieties of these.

Low density polyethylene (LDPE) is ordinarily prepared using a free-radical initiator (such as peroxides, oxygen, air) in high pressure equipment. Historically the term "ICI-type polyethylene" has been used by many practioners to denote polyethylene made in a high pressure, free-radical process. The density of these LDPE polymers (usually in the range of about 0.910–0.935 gms./cc) is generally attributed to the inherent presence of polymer side-chains. They are generally referred to as branched polyethylene in contradistinction to linear polyethylene.

The present invention involves the above-described LLDPE polymers, not the LDPE or HDPE polymers.

The high molecular weight, linear low density ethylene copolymers within the purview of the present invention are those made under conditions which are conducive to preparation of linear polymers such as by the well-known Ziegler or Phillips processes. The instant ethylene polymers contain minor amounts (generally about 3% to about 20% by weight) of at least one alpha-olefin comonomer selected from the group consisting of propylene, 1-butene, 1-isobutene, 1-pentene, 1-isopentene, 1-hexene, 1-isohexene, 1-heptene, 1-isoheptene, 1-octene, 1-isooctene, 1-nonene, 1-isononene, 1-decene, 1-isodecene, and the like. The amount of comonomers used is enough to result in polymer densities in the low range of about 0.90–0.94 gms./cc. The instant copolymers are also characterized as being high molecular weight, having a melt index (melt flow value) in the range of about 0.1 gm/10 min. as measured by ASTM-D-1238 condition (E) to about 50 gms./10 min. as measured by ASTM-D-1238 condition (D), and as having, inherently, high block and low slip characteristics. Such polymers are ideally suited for use where high or moderate strength, extrusion-cast or blown films are used as packaging materials, but the high block is detrimental when the film is manufactured in the customary manner involving large rolls, especially when rolled at very warm conditions. During shipping and/or storage, the high block polymers tend to adhere layer-to-layer with such a strong adhesion force that unrolling the film often causes distortion, and even tearing, of the film especially if the film is very thin. It appears that when enough of the higher alkene comonomers are used in the linear ethylene copolymer to result in a relatively low density polymer (i.e., about 0.90 to about 0.94 gms./cc), the pendant alkyl groups provide surface phenomena or surface properties which result in high block and low slip. The nature of this phenomenon is not fully understood. The phenomenon is observed even on films of the subject polymers when employed as a "core" layer between two very thin outer layers of ordinary LDPE.

The ethylene/acrylic acid interpolymer used in the present invention is characterized as a random interpolymer prepared at high pressure by the action of a free-radical polymerization initiator, acting on a mixture of ethylene and acrylic acid monomers, said random interpolymer being further characterized as containing about 0.5 to about 50 weight percent of the acrylic acid moiety, a density in the range of about 0.91 to about 1.3 gms./cc, and a melt flow value of from about 150 gms./10 min. as measured by ASTM D-1238 (Condition B) to about 0.1 gm./10 min. as measured by ASTM D-1238 (Condition E).

The copolymers used in the present novel blends are more precisely referred to as "interpolymers" because they are formed by the polymerization of a mixture of the comonomers, in contradistinction to copolymers made by "grafting" or "block-polymerization" methods.

The term "block" is used here to describe the adhesion of two layers of the film to each other by the application of even slight compression and where pulling apart of the layers is likely to create even small changes in the film and/or handling problems. such "blocking" is also somewhat dependent on, or responsive to, the amount of compression applied as well as to the duration of the compression and to the temperature. "Destructive block" refers to tendencies to form substantially irreversible adhesion where peeling apart is likely to cause deformation or tearing of the film; such "destructive block" can occur even when compression forces are small, such as when rolls of the film are made during manufacture, especially when the rolls are prepared, stored, or shipped under very warm or hot conditions.

In the absence of any available or suitable ASTM test for measuring the block properties in the present invention, the following tests were devised:

A balanced beam is provided with an empty water-reservoir suspended from one end and a 3.75" by 3.75" by 1" block (about 14 in.$^2$ face) suspended from the other end. Immediately below the said 14 in.$^2$ (90.3 cm$^2$) block is a similar 14 in.$^2$ block, and the two 14 in.$^2$ flat surfaces of the blocks barely touch when no weight is applied to either end of the balanced beam. The lower block is fixed and does not move. The balanced beam rests on a blade-edge fulcrum and is very sensitive to small weights. Two film specimens, each measuring about 6" by 6" are brought together so that a complete side (face) of one specimen is totally against a complete side (face) of the other. The so-formed 2-ply specimen of 6"×6" dimension is centered between the two 14 in.$^2$ blocks (while the beam is restrained from moving) with the two blocks touching the upper and lower surfaces of the 2-ply specimen. The protruding edges of the 2-ply specimen are separated from each other by hand, the freed edges of the upper ply being affixed in some manner (e.g., rubber band or an adhesive) to the outer edges of the upper block and the freed edges of the lower ply being affixed to the outer edges of the lower block, leaving the 14 in.$^2$ portion of the 2-ply specimen still clinging, ply-to-ply, between the blocks. When the specimen is ready for testing, the restraint on the beam is removed and water is rapidly dripped into the reservoir on the other end of the beam. For consistency from test to test, the rate of water dripping is substantially consistently at a rate such that the drips are too fast to be easily counted. When the two plys of film become parted the water addition is stopped and the weight of water in the reservoir is determined in grams. For "ordinary" "block," the two plys of film are merely brought together (excluding air bubbles) in such a manner that not more than negligible compression is used. For "induced block" a compression force of 4.12 pounds is applied for 24 hours at ambient room conditions (23° C., 50% R.H.) by putting a 5"×5" flat steel plate (4.12 lbs.) on top of the 2-ply specimen, using Mylar plastic sheets on each side of the 2-ply specimen to avoid any unwanted blocking or clinging to the table top to the steel plate; this compression force is about 0.1648 lbs./in.$^2$ (or about 11.6 gms./cm$^2$). After this the 2-ply sample is positioned between the blocks of the test apparatus and fastened to the blocks and tested as described above. "Induced hot block" is tested the same way as above except that the pressure of the steel plate is maintained for 24 hours at a temperature of 60° C. in a temperature-controlled oven. Each test of block is repeated a plurality of times and the results averaged; in this specification the block values reported are the average of 4 specimens unless otherwise noted.

Induced "hot block" is an accelerated test made to simulate extended warehouse (or other) storage conditions where ambient temperatures can reach as high as about 140° F. (60° C.) on hot days.

For purposes of description in this disclosure, the following "block" ranges are arbitrarily assigned for the relative results obtained by experience using the above-described block tests:

| Approximate Block Range gms. | Relative Effect |
|---|---|
| up to about 50 | This is a good, acceptable range which generally gives no handling or "peel-off" problems with rolls or stacks of films. |
| about 50–150 | this is a "high block" range where one may encounter some handling problems and slower "peel-off" rates with rolls or stacks of films. |
| about 150–550 | this is an "excessive block" range wherein handling problems are very pronounced and where "peel-off" of rolls or stacks is seriously hampered; in some cases one may encounter "destructive" block, such as with very thin films which easily tear or stretch. |
| above about 550 | "destructive" blocking is most likely encountered, making handling or peel- |

| Approximate Block Range gms. | Relative Effect |
|---|---|
| | off of stacks or rolls practically hopeless. |

When a reduction in block is made there is an accompanying improvement in handling.

The "heat seal range" is determined by heat-sealing two plies of the film (usually having a film thickness in the range of 1.5 to 5.0 mils) by pressing (clamping) the films together using a heated bar with a TEFLON polymer surface beneath the films. Sealing is tested over a range of temperatures at 10° F. intervals, each test being made on a different portion of the films. Dwell time for the heated bar against the films is calculated as: seconds=two-thirds of film thickness. Thus, e.g., a film 1.5 mils thick is heat-clamped for 1 second, and a film 3.0 mils thick is heat-clamped for 2 seconds. A "poor seal" is one which can be separated without tearing the film. A "good seal" is one which cannot be separated completely without tearing the film. "Burn-throughs" can occur when the temperature is too high. The temperature range over which "good" seals are obtained is taken as the heat seal range. The "fusion temperature" is the minimum temperature required to form a seal.

Measurements for slip angle and coefficient of friction are made as follows:

Slip angle is measured on an inclinable flat, smooth plane equipped with a drive mechanism which lifts one end of the plane through an increasing angle at a rate of 2.5° per second. A 1000-gm stainless steel block of 4"×2.5"×0.75" thick is used as the sample holder. Film samples are conditioned in the testing lab at about 23° C. and 50% R.H. for 8 hours before testing. A 4"×6" sample film specimen is affixed to the lower side of the steel block by using adhesive type on the film edges on top of the steel block; it is mounted so that the machine-direction of film is aligned along the 4" direction of the steel block and along the path of slip. For film-to-film testing, another film specimen is affixed to the inclinable surface and the film on the steel block is placed on that. For film-to-metal testing, a smooth metal plate is used on the plane. A limit switch is affixed to the inclinable plane approximately 0.25" from the steel block. As the plane is elevated at one end and the steel block slips down the plane, it actuates the limit switch which stops the driving force and the angle (from horizontal) is measured. Ordinarily three tests are made and the average is recorded as the slip angle.

Coefficient of friction is measured on a flat, high-polished horizontal metal plane using a specimen "sled," a strain cell with 0–300 gram range connected to a 10 millivolt recorder, and a driving force which moves the plane at the rate of 1 inch per 11 seconds. The sled is a 200-gram, 2.5"×2.5"×0.25" thick flat slab of stainless steel with the bottom surface covered with a sheet of sponge rubber. The film specimen, 4"×4", is conditioned at 23° C. and 50% R.H. for 8 hours before testing and affixed against the sponge rubber surface of the sled and is attached to the strain cell. Film-to-film measurements are made by affixing another specimen of the film onto the horizontal plane; film-to-metal measurements are made by placing the sled (with the sample affixed thereto) directly on the metal plane. The driving force moves the plane horizontally and the sled is held stationary by the strain cell. The pulling force against the strain cell, caused by friction between sled and plane, is recorded. The initial maximum peak reading is taken as the "static" force at which relative movement between the film surfaces begins. "Kinetic" force, the amount of force required to maintain the relative movement after it has started, is taken as the average of 7 one-inch spaced readings from the recorder. The static and kinetic coefficients of friction (C.O.F.) are computed by the following equations:

$$\text{static } C.O.F. = \frac{\text{static force}}{200}$$

$$\text{kinetic } C.O.F. = \frac{\text{sustained motion force}}{200}$$

Ethylene-acrylic acid interpolymers, particularly interpolymers consisting of less than 15 percent by weight combined acrylic acid, possess relatively poor film optical properties. The bulk and film impact properties, particularly low-temperature impact properties are poor. These interpolymers are further characterized by excessive blocking tendencies and for interpolymers of higher (greater than 10) melt flow values, less than adequate heat seal properties.

Now, in accordance with the present invention, unexpected and marked improvements in film clarity, gloss, impact, heat seal and antiblocking can be accomplished in ethylene-acrylic acid interpolymers by the blending therein to substantial homogeneity, i.e., to the formation of an intimate admixture, specific amounts of a linear low density ethylene copolymer. Linear low density ethylene copolymer, itself, generally exhibits poor film optics and excessive blocking.

Surprisingly, the marked optical improvements and block reductions can be achieved simultaneously. Usually, as film clarity and gloss (surface smoothness) increase, film blocking tends to increase proportionately. However, it has been discovered that the improvements in ethylene-acrylic acid copolymers are dependent upon the melt flow (rheology) and density of the linear low density ethylene copolymer.

Additionally, the admixing of specific levels of a linear low density ethylene copolymer to an ethylene-acrylic acid interpolymer allows significant improvements in extrusion coating properties and adhesion to specific non-metallic substrates, e.g. oriented polypropylene (OPP).

The ethylene-acrylic acid copolymer/linear low density ethylene copolymer blend can comprise from about 1 percent by weight to about 80 percent by weight of linear low density ethylene copolymer. Preferably, the blend comprises from about 70 percent by weight to about 95 percent by weight of an ethylene-acrylic acid copolymer and from about 5 percent by weight to about 30 percent by weight of linear low density ethylene copolymer.

The preferred ethylene-acrylic acid interpolymers have densities from about 0.92 to about 0.96 g/cc and melt flow values from about 1 to about 15 g/10 min (ASTM D-1238-E). The preferred linear low density ethylene copolymers consist of 1-octene at less than 12 percent by weight. These copolymers have melt flow values from about 0.3 to about 20 g/10 min. (ASTM D-1238 condition E) and densities from about 0.92 to about 0.93 g/cc.

The method in which the ethylene-acrylic acid copolymer/linear low density ethylene copolymer blend is prepared is not particularly critical within the preferred range of proportions and with the inclusion of the preferred ingredients. Any conventional mixing device. e.g. a Banbury, which provides substantial homogeneity can be employed. Another possible method is to prepare the blend in a twin-screw mixing extruder at the desired proportions. It is also possible to prepare an ethylene-acrylic acid copolymer/linear low density ethylene copolymer "master-batch" concentrate and then add the appropriate quantity of either virgin resin to obtain the desired proportions. It is also appropriate to incorporate other polymer additives, e.g., plasticizers, colorants, fillers, processing aids, antiblocks, stabilizers, etc. in the concentrate to enhance their dispersibility in the final blend.

Films of the blends of this invention are readily prepared by (1) intimately admixing the olefin copolymers and (2) extruding the resulting mixture in the form of a clear, flexible sheet or film which is subsequently cooled in a draw-down procedure to form a film having an average thickness in the range of about 0.3 mil to about 10.0 mils or more. The thin sheet is extruded and drawn onto a chill roll. Films made by the well-known blown-bubble technique are beneficially made using the present blends.

Mixing of the required components is readily carried out in a conventional mixing apparatus such as a Banbury mixer or screw-type extruder. In one embodiment wherein the mixing device is a screw-type extruder, the materials are fed into the barrel of the extruder. The extruded mixture may be mixed with additional polymer(s) prior to final extrusion or may be fed directly into an extruder equipped with a sheet die or annular die and extruded in the form of a transparent flexible film or sheet. In one extrusion operation the transparent sheet is extruded onto a chill roll and is drawn down to form a film having the desired thickness, usually between about 0.3 to about 10.0 mils (1 mil=0.0254 mm.). In another operation the blend is extruded through an annular die in the well-known blown-bubble technique. Suitable extrusion apparatus include a typical screw-type extruder, an extruder equipped with a ramming device and the like.

In a preferred embodiment the mixing and extruding steps are carried out in a single apparatus which is a typical screw-type extruder that is equipped with a sheet die or annular die and feed means placed along the extruder barrel which houses the screw or screws of the extruder. The blend materials are introduced as the polymer is being extruded at a rate such that a constant mixture is maintained. Similarly, concentrated master-batches can be added to virgin material in the screw-type extruder.

The effect of various additives on slip and block characteristics of the polymer are tested by incorporating the additives into the polymer and fabricating the mixture into film.

The examples which follow illustrate particular embodiments, but the present invention is not limited to the embodiments illustrated.

EXAMPLE 1

80 pounds of an ethylene-acrylic acid interpolymer prepared by conventional high pressure copolymerization containing 15 weight percent acrylic acid and having a melt flow value of 7.1 g/10 minutes (ASTM-D 1238 condition E) was dry blended with 20 pounds of an LLDPE copolymer containing 8 weight percent 1-octene and having a melt flow value of 5.4 g/10 minutes (D-1238-E). The dry blend was then melt-blended in a twin-screw compounding extruder at a plastic temperature of 350° F. (177° C.). The pelletized product was blown into 1.5 mil layflat film by conventional inflation techniques at a plastic temperature of 202° C. and at a 3.25/1 blow-up ratio using a 2½" NRM 20/1, L/D extruder equipped with a standard mixing screw. The resultant film had a 20° film gloss of 91.5 measured according to ASTM-D 2457. The 20° film gloss for the same ethylene-acrylic acid interpolymer (fabricated as above) was 74.5 (ASTM-D 2457).

EXAMPLES I THROUGH XI

A series of runs were made to illustrate the optical, impact, heat seal and antiblocking properties of several polymer blends of the present invention and to compare these properties to the performance of the individual polymers in the blends. In preparing the blends, the polymers were admixed in a tumble blender at various proportions. The polymer dry blends were melt-blended on a twin-screw mixing extruder where the screw torque was held at approximately 90% throughout the entire series. The melt temperature ranged from about 121° C. to about 205° C. at a constant screw speed of 200 rpms. The pelletized products were blown into 1.5 mil lay-flat film at 3.25 blow-up ratio and melt temperatures ranged from about 177° C. to about 204° C.

The data from the runs are shown in the following tables. In the tables, Dart Impact is according to ASTM-D-1709-67; −50° C. Izod Impact is according to ASTM-D-256-56; Tensile Impact is according to ASTM-D-1822; Gardner Clarity is according to ASTM-D-1746; 20° Gloss and 45° Gloss are according to ASTM-D-2457; Block is according to the procedure described hreinbefore; Heat Sealability is according to the procedure described hereinbefore; Haze is according to ASTM-D-1003-52.

Tables I through IX show data for Runs I through XI to illustrate the present invention in comparison with control runs which do not illustrate the present invention. Test data for Table VI was obtained as follows:

A. ADHESION TO ORIENTED POLYPROPYLENE (PEEL TEST)

To determine the adhesion to OPP, pelletized blends were compression molded on a hydraulic press at 177° C. to produce 25 mil (thickness) plaques. Four laminates were prepared by placing OPP film onto the individual plaques and compression molding these composites at 177° C. under 500 psi (pressure) for 1 minute after dwelling 3 minutes at 177° C. under no pressure. The laminates were cooled to 25° C. under 500 psi and tested for bond strength using an Instron Tensiometer according to ASTM D903-49. The bond strength (adhesion) was taken as the average of the four determinations.

B. DRAWDOWN AND NIP SPEED (EXTRUSION COATING PROPERTIES)

Drawdown in extrusion coating is the maximum haul-off speed and minimum coating thickness that the polymer blend can be applied to a substrate (e.g. OPP). Drawdown failure is the complete and instantaneous breaking of the molten coating web across its entire width. The haul-off speed at which failure occurs is the recorded drawdown speed. Nip in extrusion coating is the partial tearing of the molten web on (or at) its edges. The haul-off speed at which this partial tear is initially observed is recorded as the Nip speed. Hence, Nip occurs at a lower haul-off rate then drawdown. The actual extrusion coating operation was performed on a 3½" Black Clawson extrusion coater having a 32:1 length to diameter ratio equipped with a "thermally neutral" polyethylene screw. The die deckle width was 24 inches, and the die itself was the slot-type with a 0.02 inch gap. The extrusion rate was 10# polymer/hr./inch die gap onto 40 lb. Kraft paper.

TABLE I

| Run | EAA[a] Copolymer wt. % | LLDPE[b] Copolymer wt. % | Dart Impact gms. | −50° C. Izod ft-lbs/in. | Tensile Impact ft-lbs/in.$^2$ |
|---|---|---|---|---|---|
| I | 90 | 10 | 473 | 0.94 | 193 |
| II | 80 | 20 | 523 | 1.12 | 210 |
| Control | 100 | 0 | 466 | 0.56 | 174 |
| Control | 50 | 50 | 390 | 0.62 | 174 |
| Control | 0 | 100 | 152 | 0.69 | 160 |

[a]Random ethylene-acrylic acid copolymer of 15% A.A. by wt., melt flow value of 7.1 g/10 min. (ASTM-D-1238-E).
[b]Linear low density ethylene/1-octene copolymer, melt flow value of 5.4 g/10 min. (ASTM-D-1248-E), 0.9219 g/cc density.

TABLE II

| Run | EAA[c] Copolymer wt. % | LLDPE[d] Copolymer wt. % | Dart Impact gms. | Gardner Clarity | 20° Gloss |
|---|---|---|---|---|---|
| III | 90 | 10 | 368 | 43.0 | 90.5 |
| IV | 80 | 20 | 432 | 45.0 | 94.8 |
| Control | 100 | 0 | 355 | 28.7 | 64.1 |
| Control | 50 | 50 | 250 | 0.3 | 12.1 |
| Control | 0 | 100 | 152 | 2.3 | 19.4 |

[c]Random ethylene-acrylic acid copolymer of 14.5% A.A. by wt., melt flow value of 12.3 g/10 min. (ASTM-D-1238-E).
[d]Same as (b) in Table I.

TABLE III

| Run | EAA[e] Copolymer wt. % | LLDPE[f] Copolymer wt. % | LLDPE[g] Copolymer wt. % | Block gms. |
|---|---|---|---|---|
| V | 90 | 10 | 0 | 98.9 |
| VI | 80 | 20 | 0 | 80.4 |
| VII | 80 | 0 | 20 | 61.5 |
| Control | 100 | 0 | 0 | 136.6 |
| Control | 50 | 0 | 50 | 90.5 |

[e]Random ethylene-acrylic acid copolymer of 10% A.A. by wt., melt flow value of 9.07 g/10 min. (ASTM-D-1238-E).
[f]Linear low density ethylene/1-octene copolymer, melt flow value of 0.59 g/10 min. (ASTM D-1238-E), 0.9329 g/cc density.
[g]Linear low density ethylene/1-octene copolymer, melt flow value of 0.89 g/10 min. (ASTM D-1238-E), 0.9210 g/cc density.

TABLE IV

| Run | EAA[e] Copolymer wt. % | LLDPE[h] Copolymer wt. % | Heat Sealability °F. Range | Fusion Temp., °F. | Burn-Through Temp., °F. | Strength[i] lbs-in. width |
|---|---|---|---|---|---|---|
| VIII | 80 | 20 | 60 | 210 | 270 | 2.62 |
| Control | 100 | 0 | 40 | 220 | 260 | 2.03 |
| Control | 50 | 50 | 10 | 260 | 270 | 2.28 |

[e]Same as in Table III.
[h]Linear low density ethylene/1-octene copolymer, melt flow value of 1.93 g/10 min. (ASTM D-1238-E), 0.9330 g/cc density.
[i]Strength measured on samples prepared at 10° F. below the burn-through temperature.

TABLE V

| Run | EAA[i] Copolymer wt. % | LLDPE[b] Copolymer wt. % | Gardner Clarity | Haze, % | 20° Gloss | Film Blocking gms. |
|---|---|---|---|---|---|---|
| IX | 90 | 10 | 43.4 | 2.28 | 76.2 | 185.5 |
| Control | 100 | 0 | 33.6 | 3.04 | 50.8 | 274.7 |
| Control | 50 | 50 | 0.4 | 10.72 | 12.5 | 68.7 |
| Control | 0 | 100 | 2.3 | 24.85 | 19.4 | 77.5 |

[i]Random ethylene-acrylic acid copolymer of 6.5% A.A. by wt., melt flow value of 4.7 g/10 min. (ASTM-D-1238-E).
[b]Same as (b) in Table I.

TABLE VI

| Run | EAA[a] Copolymer wt. % | LLDPE[b] Copolymer wt. % | Extrusion Coating Properties Nip[c] speed, fpm | Draw-down[d] speed, fpm | Peel-test[e] Adhesion to OPP[f] lbs./in. width |
|---|---|---|---|---|---|
| X | 90 | 10 | 500 | 825 | 6.1 |
| Control | 100 | 0 | 200 | 350 | 0.75 |

[a]Same as (a) in Table I.
[b]Same as (b) in Table I.
[c]Nip speed is measured as described supra.
[d]Draw-down speed is measured as described supra.
[e]Peel-test is as described supra.
[f]OPP means oriented polypropylene.

TABLE VII

| Run | EAA[j] Copolymer wt. % | LLDPE[b] Copolymer wt. % | Gardner Clarity | Haze, % | 20° Gloss | 45° Gloss |
|---|---|---|---|---|---|---|
| XI | 80 | 20 | 42.5 | 3.83 | 61.6 | 76.4 |
| Control | 100 | 0 | 39.1 | 3.81 | 35.1 | 68.7 |
| Control | 70 | 30 | 2.31 | 5.81 | 28.3 | 66.6 |
| Control | 0 | 100 | 2.3 | 24.85 | 19.4 | 77.5 |

[j]Random ethylene-acrylic acid copolymer of 9.0% A.A. by wt., melt flow value of 7.6 g/10 min. (ASTM-D-1238-E).
[b]Same as (b) in Table I.

TABLE VIII

| Run | EAA[j] Copolymer wt. % | LDPE[k] polymer wt. % | Gardner Clarity | Haze, % | 20° Gloss | 45° Gloss | Dart Impact gms. |
| --- | --- | --- | --- | --- | --- | --- | --- |
| Control | 100 | 0 | 39.1 | 3.8 | 35.1 | 68.7 | 405 |
| Control | 80 | 20 | 0.0 | 16.4 | 10.7 | 34.86 | 305 |
| Control | 0 | 100 | 46.0 | 5.25 | 52.4 | 65.2 | 134 |

[j]Same as (j) in Table VII.
[k]Low density ethylene homopolymer, melt index of 2.0 g/10 min. (ASTM D-1238-E), 0.9210 g/cc density.

TABLE IX

| Run | EAA[j] Copolymer wt. % | HDPE[l] polymer wt. % | Gardner Clarity | Haze, % | 20° Gloss | 45° Gloss | Dart Impact gms. |
| --- | --- | --- | --- | --- | --- | --- | --- |
| Control | 100 | 0 | 39.1 | 3.8 | 35.1 | 68.7 | 405 |
| Control | 80 | 20 | 8.25 | 10.2 | 21.0 | 55.4 | 245 |
| Control | 0 | 100 | 42.7 | 12.3 | 53.6 | 48.6 | 49 |

[j]Same as (j) in Table VII.
[l]high density linear polyethylene, melt index of 5.0 g/10 min. (ASTM D-1238-E), 0.952 g/cc density.

The compositions of this invention are useful as film and coatings in such applications as blister packaging, flexible packaging, "retort" pouches, overwraps, aseptic packaging, laminates, adhesive composite structures, barrier films, trash bags and metallized films. Such films are also useful in co-extruded multi-layer films to enhance the properties of the outer layers. Such films possess adhesion properties due to the presence of carboxyl containing interpolymers such as ethylene-acrylic acid copolymer. Said films are beneficially extrusion-coated onto metallic and non-metallic substrates to exploit their adhesive properties.

We claim:

1. A homogeneous binary blend of an ethylene polymer and an ethylene/acrylic acid interpolymer, wherein the blend consists of between 80% to about 99% of the ethylene/acrylic acid interpolymer, the remainder being said ethylene polymer, said ethylene polymer being characterized as a linear low density ethylene interpolymer, prepared using a coordination catalyst acting as a polymerization initiator in the interpolymerization of ethylene with at least one alpha-olefin comonomer having from 3 to about 12 carbon atoms in each comonomer unit, the amount of said comonomer being an amount sufficient to constitute about 3% to about 20% by weight of the interpolymer and also sufficient to impart a low density in the range of about 0.90 up to about 0.94 gms/cc to the interpolymer, said interpolymer being further characterized as having a melt flow value of from about 0.1 gm/10 min. as measured by ASTM D-1238 (Condition E) to about 50 gm/10 min. as measured by ASTM D-1238 (Condition D), said ethylene/acrylic acid interpolymer being characterized as a random interpolymer prepared at high pressure by the action of a free-radical polymerization initiator, acting on a mixture of ethylene monomer and acrylic acid monomer, said random interpolymer being further characterized as containing about 0.5 to about 50 weight percent of the acrylic acid moiety, the remainder being the ethylene moiety, a density in the range of about 0.91 to about 1.3 gms/cc, and a melt flow value of from about 150 gm/10 min. as measured by ASTM D-1238 (Condition B) to about 0.1 gm/10 min. as measured by ASTM D-1238 (Condition E).

2. The blend of claim 1 wherein the alpha-olefin comonomer in the linear low density ethylene interpolymer comprises at least one alkene of from about 4 to about 8 carbon atoms per molecule.

3. The blend of claim 1 wherein the alpha-olefin comonomer in the linear low density ethylene interpolymer comprises 1-octene.

4. The blend of claim 1 wherein the linear low density ethylene interpolymer contains about 3% to about 12% by weight of the alpha-olefin comonomer moieties.

5. The blend of claim 1 wherein the linear low density ethylene interpolymer has a melt flow value in the range of about 0.3 to about 20 gms/10 min. as measured by ASTM D-1238 (E).

6. The blend of claim 1 wherein the linear low density ethylene interpolymer has a density in the range of about 0.92 to about 0.93 g/cc.

7. The blend of claim 1 wherein the linear low density ethylene interpolymer comprises about 5 to less than 20% by weight of the total blend.

8. The blend of claim 1 wherein the linear low density ethylene interpolymer comprises about 10 to less than 20% by weight of the total blend.

9. The blend of claim 1 wherein the ethylene/acrylic acid interpolymer comprises about 0.5 to about 15% by weight of the acrylic acid moieties.

10. The blend of claim 1 wherein the ethylene/acrylic acid interpolymer comprises about 6 to about 15% by weight of the acrylic acid moieties.

11. The blend of claim 1 wherein the ethylene/acrylic acid interpolymer has a melt flow value in the range of about 1 to about 15 gms/10 min. as measured by ASTM D-1238 (E).

12. A homogeneous binary blend of linear low density ethylene interpolymer and an ethylene/acrylic acid interpolymer, said linear low density ethylene interpolymer comprising about 5 to less than 20% by weight of the blend and being characterized as being an interpolymer of ethylene and about 3 to about 12% by wt. of an alkene of about 4 to about 8 carbon atoms, further characterized as having a melt flow value in the range of about 0.3 to about 20 gms/10 min. in accordance with ASTM D-1238 (E) and a density in the range of about 0.90 to about 0.94 gms/cc, said ethylene/acrylic acid interpolymer being characterized as having about 0.5 to about 15% by weight of acrylic acid moieties, the remainder being ethylene moieties, a melt flow value in the range of about 1 to about 15 gms/10 min. according to ASTM D-1238 (E) and a density in the range of about 0.92–0.96 gms/cc.

13. The blend of claim 12 wherein the linear low density ethylene interpolymer contains about 10 to less than 20% by weight of the blend.

14. The blend of claim 12 wherein the alpha-olefin alkene comprises 1-octene.

15. The blend of claim 12 wherein the ethylene/acrylic acid interpolymer contains about 6 to about 15% of acrylic acid moieties.

16. The blend of claim 12 wherein the linear low density ethylene interpolymer comprises an ethylene/1-octene interpolymer having a density in the range of about 0.92 to about 0.93 gms/cc. and a melt flow value in the range of about 0.3 to about 20 gms/10 min. according to ASTM D-1238 (E), and the ethylene/acrylic acid interpolymer comprises one having about 6% to about 15% acrylic acid moieties, having a density in the range of about 0.92 to about 0.96 gms/cc., and having a melt flow value in the range of about 1 to about 15 gms/10 min. according to ASTM D-1238 (E), wherein the linear low density ethylene interpolymer comprises about 10 to less than 20% by weight of the total polymer blend.

17. A method for improving the film properties of an ethylene/acrylic acid interpolymer, said method comprising homogeneously blending with said ethylene/acrylic acid interpolymer an amount of linear low density ethylene interpolymer, the said amount comprising from about 1% to less than 20% of the total weight of the blend, said ethylene/acrylic acid interpolymer being characterized as one containing about 0.5 to about 50% by weight of acrylic acid moieties, the remainder being ethylene moieties, having a density in the range of about 0.91 to about 1.3 gms/cc., and a melt flow value in the range of about 0.1 gms/10 min. according to ASTM D-1238 (E) to about 150 gms/10 min. according to ASTM D-1238 (B), said linear low density ethylene interpolymer being characterized as having about 3 to about 20% by weight of alkylene moieties of 3 to 12 carbon atoms, a density in the range of about 0.90 to about 0.94 gms/cc., and a melt flow value in the range of about 0.1 gms/10 min. according to ASTM D-1238 (E) to about 50 gms/10 min. according to ASTM D-1238 (D).

18. The method of claim 17 wherein the amount of linear low density ethylene interpolymer is in the range of about 5% to less than 20% of the total weight of the blend.

19. The method of claim 17 wherein the ethylene/acrylic acid interpolymer contains about 0.5 to about 15% weight of acrylic acid moieties.

20. The method of claim 17 wherein the linear low density ethylene interpolymer contains about 3 to about 12% by weight of alkylene monomer moieties, wherein the alkylene monomer has from about 4 to about 8 carbon atoms.

* * * * *

UNITED STATES PATENT AND TRADEMARK OFFICE
CERTIFICATE OF CORRECTION

PATENT NO. : 4,678,836

DATED : July 7, 1987

INVENTOR(S) : Osborne K. McKinney; James A. Allen & David P. Flores

It is certified that error appears in the above-identified patent and that said Letters Patent is hereby corrected as shown below:

Col. 1, line 9, "Jan. 3, 1982," should be --Jan. 3, 1984,--.

Col. 1, line 60, "sane" should be --same--.

Col. 3, line 43, "such" should be --Such--.

Col. 4, line 22, "dinary "block,'"' should read --dinary block,"--.

Col. 4, line 30, "top to" should be --top or to--.

Col. 5, line 37, "type" should be --tape--.

Col. 6, line 51 & 52, "of linear" should read --of a linear--.

Signed and Sealed this

Twelfth Day of January, 1988

Attest:

DONALD J. QUIGG

Attesting Officer

Commissioner of Patents and Trademarks